United States Patent [19]
Jordan et al.

[11] Patent Number: 5,949,920
[45] Date of Patent: *Sep. 7, 1999

[54] RECONFIGURABLE CONVOLVER CIRCUIT

[75] Inventors: Stephen D. Jordan; Catherine J. Pfister, both of Fort Collins, Colo.

[73] Assignee: Hewlett-Packard Co., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/700,717

[22] Filed: Aug. 13, 1996

[51] Int. Cl.⁶ ................................................. G06K 15/316
[52] U.S. Cl. .......................... 382/279; 382/205; 382/276; 382/305; 382/307
[58] Field of Search ................................. 382/230, 303, 382/279, 205, 308, 266, 261, 262, 263, 264, 265, 267, 268, 269; 358/457, 459, 460

[56] References Cited

U.S. PATENT DOCUMENTS

| | | | |
|---|---|---|---|
| 4,330,833 | 5/1982 | Pratt et al. | 364/515 |
| 4,750,144 | 6/1988 | Wilcox | 364/728 |
| 4,791,598 | 12/1988 | Liou et al. | 364/725 |
| 5,187,755 | 2/1993 | Aragaki | 382/39 |

*Primary Examiner*—Christopher S. Kelley
*Assistant Examiner*—Sheela Chawan

[57] ABSTRACT

A convolver includes a plurality of multipliers for multiplying pixel values of a convolution window by corresponding coefficients of a convolution mask to provide products, a summer for summing the products to provide a result and a memory for storing intermediate results. The convolver may be used to perform an N×N convolution in two or more passes. A first subset of pixel values of an N×N convolution window and a first subset of corresponding coefficients of an N×N convolution mask are supplied to the multipliers during a first pass of the N×N convolution. The summer provides an intermediate result for the first pass and stores the intermediate result in the memory. A second subset of pixel values of the N×N convolution window and a second subset of corresponding coefficients of the N×N convolution mask are supplied to the multipliers during a second pass of the N×N convolution. The summer combines the intermediate result and a result of the second pass to provide a final result or a second intermediate result for the N×N convolution.

16 Claims, 7 Drawing Sheets

RECONFIGURABLE CONVOLVER CIRCUIT

FIELD OF THE INVENTION

This invention relates to convolver circuits used in image processing and, more particularly, to a convolver circuit that may be utilized to perform convolutions with different convolution window dimensions.

BACKGROUND OF THE INVENTION

Convolutions are used in image processing to perform low-pass filtering (blurring), high-pass filtering (sharpening), edge detection, edge enhancement and other functions. Convolution is a weighted sum of pixels in the neighborhood of a source pixel. The weights are determined by a matrix of coefficients called a convolution mask or convolution kernel, which is usually square. The dimensions of the matrix are usually odd, so that the location of the center of the matrix corresponds to the location of the output pixel. A sliding window, called a convolution window, is centered in sequence on each pixel in a source image. An output pixel value is computed by multiplying each pixel value in the convolution window by the corresponding coefficient in the convolution mask and summing the products.

It may be required to perform convolutions with different convolution window dimensions. For example, 5×5 and 7×7 convolutions may be required under different circumstances. Performing a 7×7 convolution on a two-dimensional image requires 49 multiplies and 48 adds for each output pixel generated. Images that are filtered with a 7×7 convolution mask often have 256×256 or 512×512 pixels. A software approach relying on a CPU's math units is quite slow. A dedicated 7×7 hardware convolver offers desirable performance, but is expensive, since it uses 49 multipliers and 48 adders.

It is desirable to provide a convolver circuit which performs convolutions at high speed, which can perform convolutions with different convolution window dimensions and which is relatively inexpensive.

SUMMARY OF THE INVENTION

According to a first aspect of the invention, a reconfigurable convolver for performing a convolution of pixels of an image is provided. The convolver comprises a plurality of multipliers for multiplying pixel values of a convolution window by corresponding coefficients of a convolution mask to provide products, a summer coupled to the multipliers for summing the products to provide a result, a memory for storing intermediate results and a controller. The controller comprises means for supplying to the multipliers, during an M×M convolution, pixel values of an M×M convolution window and corresponding coefficients of an M×M convolution mask. The summer provides a final result for the M×M convolution. The controller further comprises means for supplying to the multipliers, during a first pass of an N×N convolution, where N is greater than M, a first subset of pixel values of an N×N convolution window and a first subset of corresponding coefficients of an N×N convolution mask, wherein the summer provides an intermediate result for the first pass of the N×N convolution, means for storing the intermediate result in the memory and means for supplying to the multipliers, during a second pass of the N×N convolution, a second subset of the pixel values of the N×N convolution window and a second subset of corresponding coefficients of the N×N convolution mask, and for supplying the intermediate result from the memory to the summer, wherein the summer combines the intermediate result with a result of the second pass to provide a final result or a second intermediate result for the N×N convolution. The convolver, which typically includes M×M multiplexers, is reconfigurable to perform an M×M convolution or an N×N convolution. In one embodiment of the reconfigurable convolver, a 5×5 convolver is used to perform a 7×7 convolution in two passes.

The N×N convolution may require more than two passes. In this case, the controller further includes means for supplying to the multipliers, during each of one or more intermediate passes of the N×N convolution, an intermediate subset of the pixel values of the N×N convolution window and an intermediate subset of corresponding coefficients of the N×N convolution mask and for supplying to the summer, during each of the intermediate passes, an intermediate result of a preceding pass. The summer combines the intermediate result of the preceding pass with a result of the current pass to provide a current intermediate result. The result of the last intermediate pass is combined with a result of a final pass to provide a final result for the N×N convolution.

The convolver may be used in a fixed configuration to perform an N×N convolution. Two or more passes are required to perform the N×N convolution with a convolver having M×M multipliers.

The M×M convolver may also be used to perform an L×L convolution, where L is less than M. The L×L convolution performed in a single pass.

According to another aspect of the invention, a method for performing a convolution of pixels of an image with a convolver is provided. The convolver includes a plurality of multipliers for multiplying pixel values of a convolution window by corresponding coefficients of a convolution mask to provide products and a summer coupled to the multipliers for summing the products to provide a result. A first subset of pixel values of an N×N convolution window and a first subset of corresponding coefficients of an N×N convolution mask are supplied to the multipliers during a first pass of an N×N convolution, where N is greater than M. The summer provides an intermediate result of the first pass of the N×N convolution, and the intermediate result is stored. A second subset of pixel values of the N×N convolution window and a second subset of corresponding coefficients of the N×N convolution mask are supplied to the multipliers during a second pass of the N×N convolution, and the intermediate result is supplied to the summer. The summer combines the intermediate result with a result of the second pass to provide a final result or a second intermediate result for the N×N convolution.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
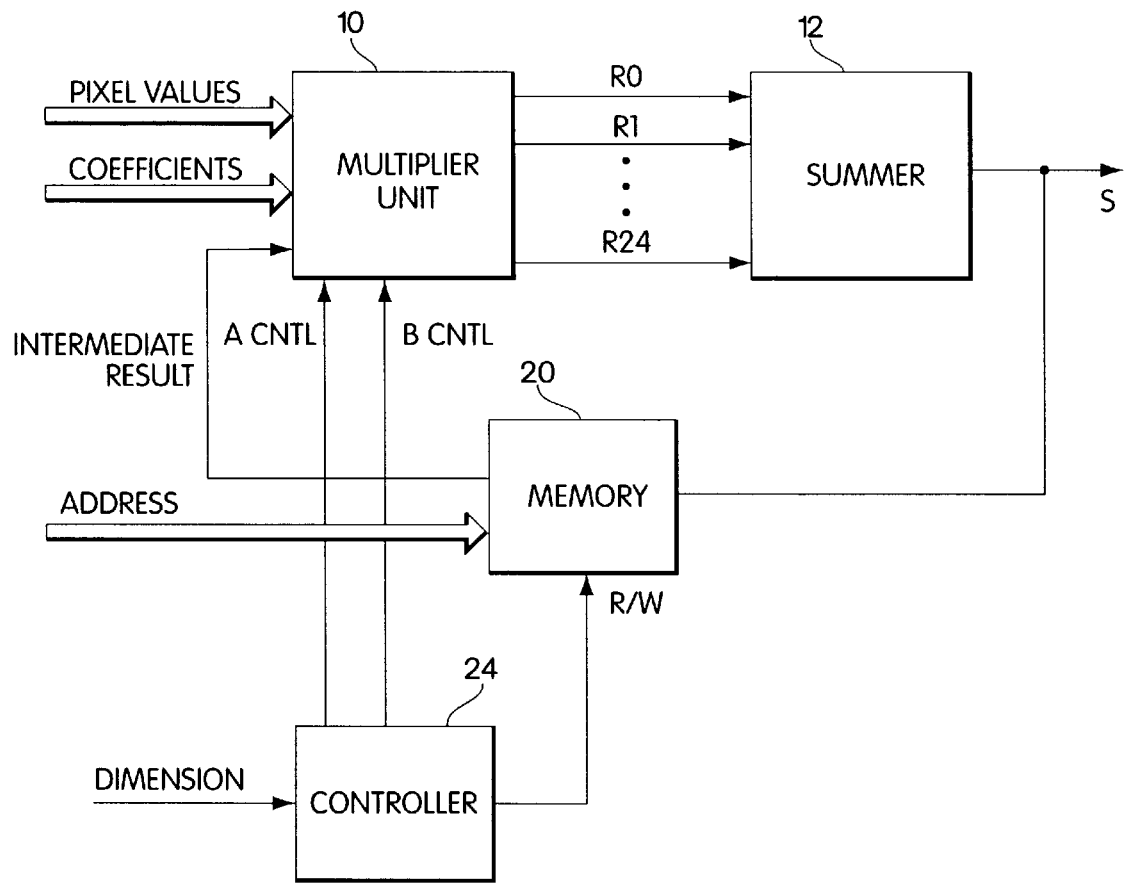
FIG. 1 is a block diagram of a convolver circuit in accordance with an embodiment of the present invention.

A block diagram of an example of a convolver circuit in accordance with the invention is shown in FIG. 1. Pixel values of a convolution window and coefficients of a convolution mask are supplied to inputs of a multiplier unit 10. The multiplier unit 10 includes an array of multipliers for performing M×M multiplications in parallel. In the example of FIG. 1, the multiplier unit 10 includes 25 multipliers in a 5×5 multiplier array and produces products R0, R1, . . . R24. The products are supplied to a summer 12 which adds the products R0, R1 . . . R24 and produces a result S.

In a 5×5 convolution, the 5×5 multiplier unit 10 receives 25 pixel values of a convolution window and 25 corresponding coefficients of a convolution mask, and produces 25 products R0, R1, . . . R24. The summer 12 combines the products and provides a result S. In one embodiment, the multiply operations are performed in a single clock cycle, and the add operations are pipelined, with one result being computed in each clock cycle. It will be understood that the speed is a function of the circuit implementation utilized. The pixels of an image are convolved in sequence to effect convolution of an entire image.

The convolver circuit shown in FIG. 1 may be reconfigured to perform a convolution with a convolution window dimension that is larger or smaller than M×M. Thus, an M×M convolver circuit having M×M multipliers may be reconfigured to perform an N×N convolution, where N is greater then M. In the above example, the 5×5 convolver circuit may be reconfigured to perform a 7×7 convolution.

In general, the reconfigured convolver circuit operates as follows. Pixel values of a first subset of an N×N convolution window and a first subset of corresponding coefficients of an N×N convolution mask are supplied to multiplier unit 10 during a first pass of the N×N convolution, and the summer 12 produces an intermediate result. The intermediate result is stored in a memory 20. The pixels of the image are processed during the first pass, and an intermediate result is stored in memory 20 for each pixel in the image.

Memory 20 has sufficient capacity to store an intermediate result for each pixel in the image. Preferably, each location in memory 20 has a greater bit width than the pixel values in order to maintain a desired precision in the final result. In one embodiment, memory 20 utilizes 32 bit words when the pixel values are 16 bits. In an alternative approach, floating point math is utilized.

During a second pass of the N×N convolution, a second subset of pixel values of the N×N convolution window and a second subset of corresponding coefficients of the N×N convolution mask are supplied to multiplier unit 10, and the intermediate result is read from memory 20. The products produced by multiplier unit 10 during the second pass are combined with the intermediate result by summer 12 to produce a final result. Each pixel in the image is processed in the same way during the second pass. Thus, the M×M convolver circuit may perform an N×N convolution in two passes.

Although more time is required for performing the convolution in two passes, the convolver circuitry is significantly reduced. In the above example, a 5×5 convolver circuit is used to perform a 7×7 convolution in two passes. The 5×5 convolver circuit includes 25 multipliers and 24 adders. By contrast, a 7×7 convolver circuit requires 49 multipliers and 48 adders. It will be understood that the convolver circuit, including multiplier unit 10 and summer 12, may have different dimensions (different numbers of multipliers) and that the convolution window may have different dimensions (different numbers of pixels). Thus, more than two passes may be required to perform a given convolution. When more than two passes are utilized, the intermediate results of each pass are stored in memory 20 and are combined with the result of the next pass until a final result is obtained.

A controller 24 controls the multiplier unit 10 and the memory 20. The controller 24 supplies to the multiplier unit 10 an A control signal which indicates, in the 7×7 convolution, the dimension of the convolution to be performed and a B control signal which, in the 7×7 convolution, indicates the current pass of the convolution. The controller 24 also controls reading and writing from memory 20. During the first pass, intermediate results are written in memory 20. During the second pass, the intermediate results are read from memory 20 and are supplied to multiplier unit 10 or directly to summer 12. When the convolution requires more than two passes and/or for larger values of N, additional control signals may be required.

More than two passes may be required to perform an N×N convolution with an M×M convolver circuit. In this case, each intermediate pass produces an intermediate result. The result of each intermediate pass is combined with the result of the preceding pass to produce a new intermediate result, which is stored in memory 20. The result of a final pass is combined with the result of the last intermediate pass to produce a final result. In this case, the configuration of memory 20 may be different from the two pass case, because an intermediate result is written and read for each pixel during each intermediate pass. Possible approaches include using a faster memory, performing the convolution more slowly, using a two-port memory and using more memory.

Figure 2:
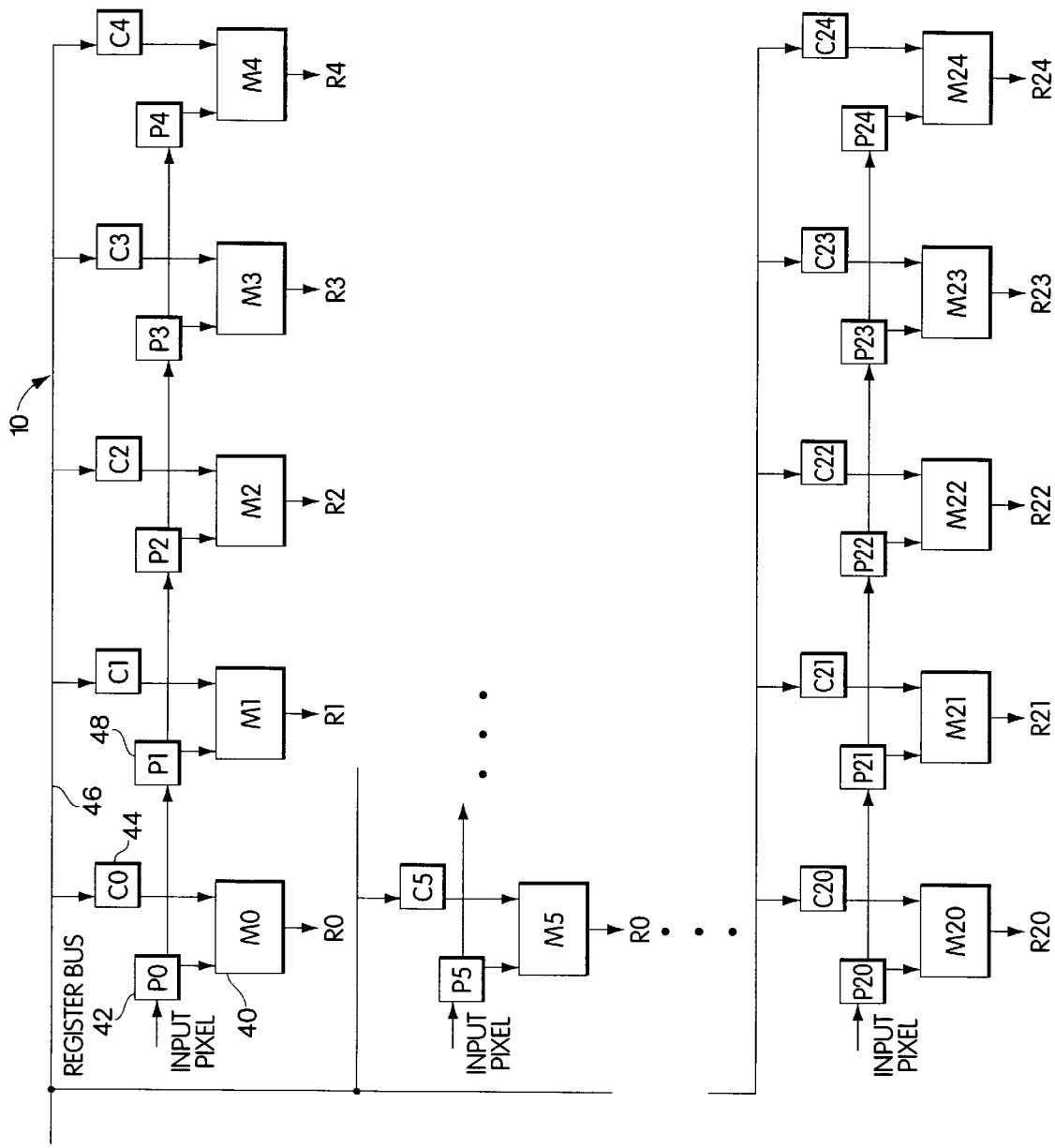
FIG. 2 is a simplified block diagram of the multiplier unit shown in FIG. 1.
Figure 7:
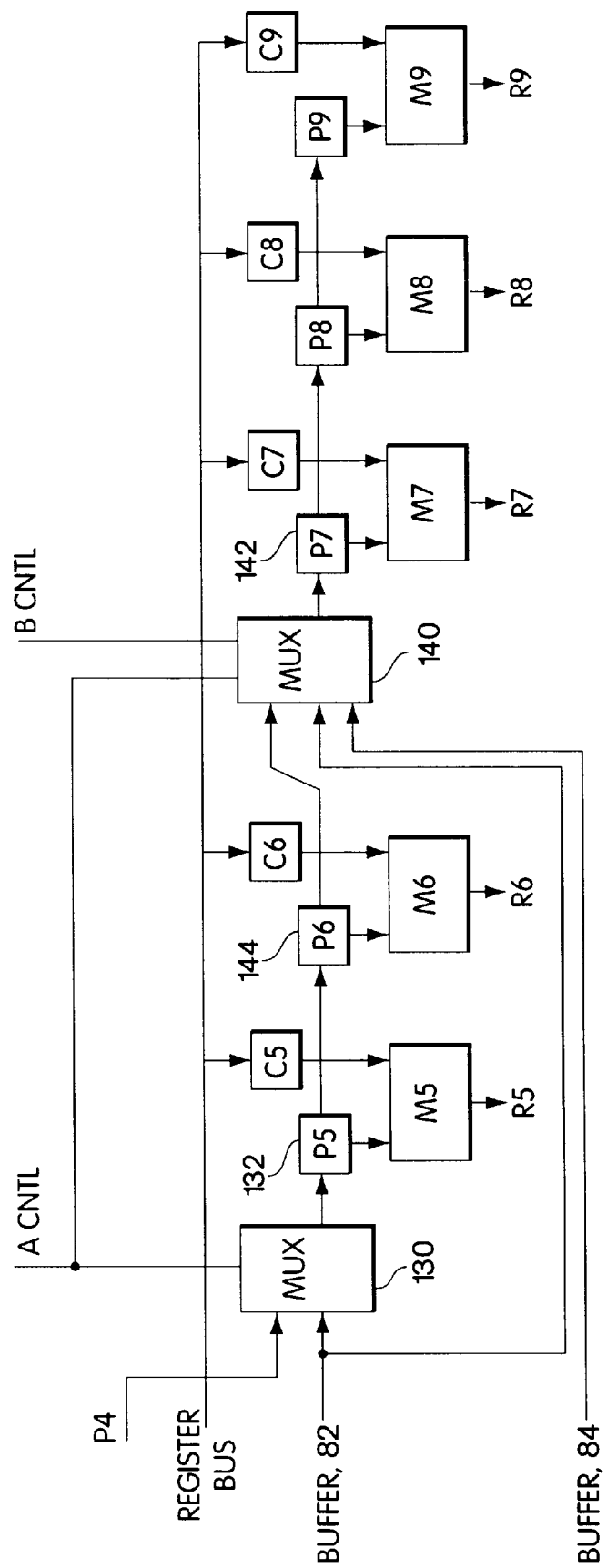
FIG. 7 is a partial block diagram of the multiplier unit illustrating the reconfigurable feature.

A block diagram of an example of multiplier unit 10 for a 5×5 convolver circuit is shown in FIG. 2. The illustrated multiplier unit has 25 multipliers M0, M1, . . . M24 in a 5×5 array. Each multiplier has an associated pixel value register and a coefficient register. Thus, for example, a multiplier 40 (M0) receives inputs from a pixel register 42 and a coefficient register 44. The multiplier 40 produces a product R0. Each coefficient register 44 receives coefficient values on a register bus 46. The coefficients of the convolution mask typically remain constant during convolution of an entire image. The pixel registers 42, 48, etc. in each row of the multiplier array are typically connected in series to permit sequential processing of the pixels in each row of the image. As described below, pixel values in the pixel registers are shifted to the right after processing of each pixel. Multiplexers for reconfiguring the multiplier unit are omitted from FIG. 2 for simplicity of illustration, but are shown in FIG. 7 and described below.

Figure 3:
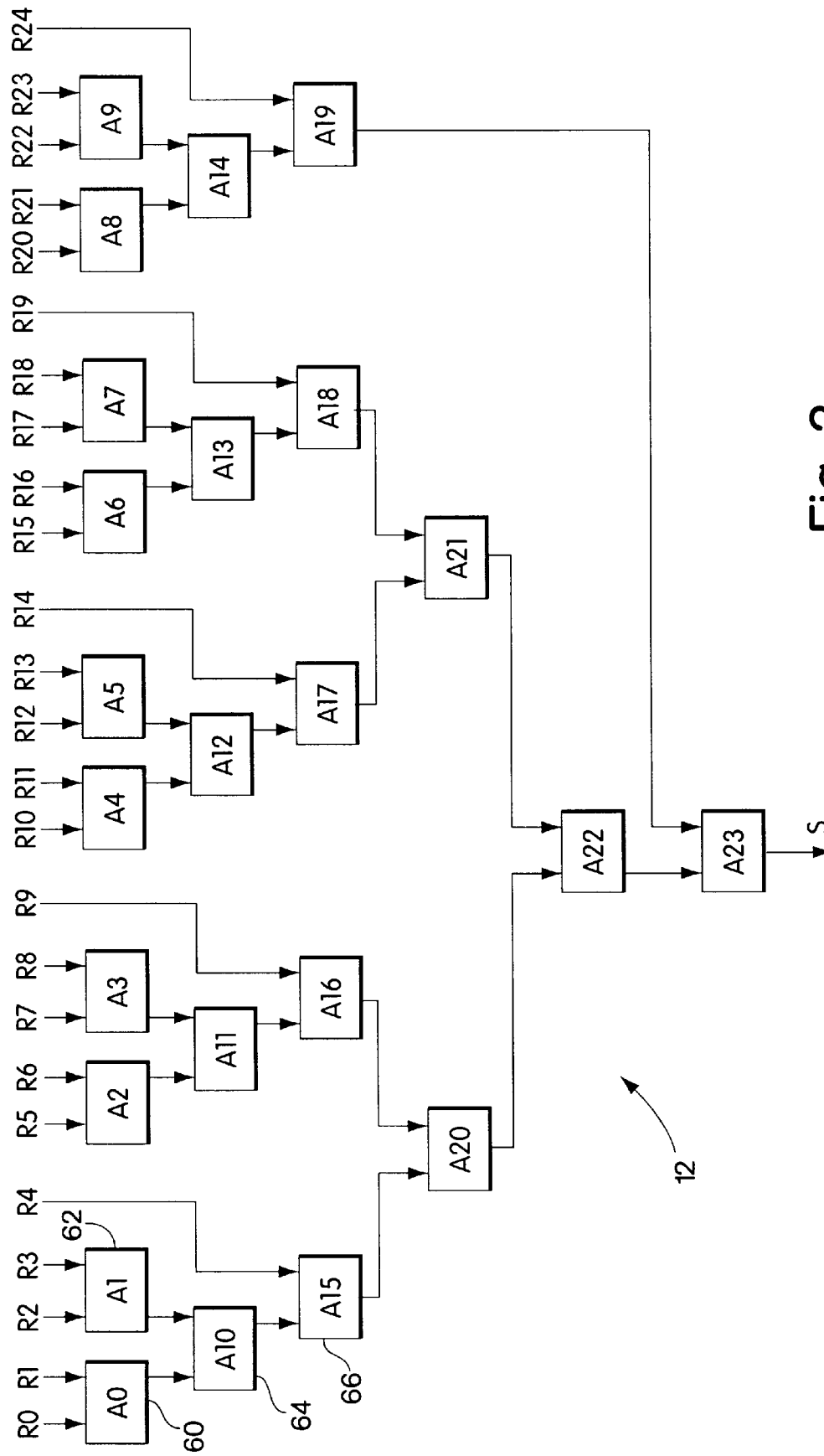
FIG. 3 is a simplified block diagram of the summer shown in FIG. 1.

A block diagram of an example of the summer 12 for a 5×5 convolver circuit is shown in FIG. 3. The products, R0, R1, . . . R24, from multiplier unit 10 are summed together to provide result S, which may be a final result of the convolution or an intermediate result, depending on the convolution being performed. The example of FIG. 3 utilizes 24 adders, A0, A1, . . . A23, to perform the summation of the products R0, R1 . . . R24 from the 25 multipliers of multiplier unit 10. An adder 60 (A0) combines products R0 and R1, and an adder 62 (A1) combines products R2 and R3. The outputs of adder 60 and 62 are combined by an adder 64 (A10), and the output of adder 64 is combined with product R4 by an adder 66 (A15). This configuration is repeated to combine the remaining products and provide result S. It will be understood that different adder configurations may be implemented in the summer 12. The requirement is to sum the products R0, R1, . . . R24.

A circuit configuration for performing a 5×5 convolution of an image, using the 5×5 convolver circuit shown in FIGS. 1–3 and described above, is shown schematically in FIG. 4. Multipliers M0, M1, . . . M24 are shown in a 5×5 array that corresponds to the convolution window of the 5×5 convolution. Pixel values for the pixels of the convolution window are supplied to the multipliers by pixel buffers 80, 82, 84 and 86. Each of the pixel buffers may hold the pixel values of one row, or line, of the image. In particular, buffer 80 shifts five pixel values in the first row of the convolution window into pixel value registers P0, P1, P2, P3 and P4 (FIG. 2) of the multiplier unit 10. Similarly, buffers 82, 84 and 86 supply five pixel values each to the pixel value registers in the second, third and fourth rows, respectively, of the multiplier unit, and pixel values for the fifth row of the convolution window may be supplied from a data source, such as a host computer. The coefficients of the convolution mask are transferred on register bus 46 into coefficient registers C0, C1, . . . C24 (FIG. 2). Now the 25 pixel values of the convolution window are multiplied by the corresponding coefficients of the convolution mask, and the products are summed to provide a result at the output of summer 12. The result corresponds to the pixel at the location of multiplier M12, at the center of the convolution window.

Next, a convolution is performed for the second pixel in the first row of the image. The convolution window is shifted one pixel to the right with respect to the image. This is effected in the embodiment of FIG. 4 by shifting the pixel values in the pixel value registers of the multiplier unit one position to the right, shifting four new pixel values from buffers 80, 82, 84 and 86 into the pixel value registers of multipliers M0, M5, M10 and M15, respectively, and shifting a new pixel value into the pixel value register of multiplier M20. This operation effectively shifts the convolution mask one pixel to the right with respect to the image. The pixel values are multiplied by the corresponding coefficients of the convolution mask, and the products are summed to provide a result for the second pixel in the first row. This process is repeated for all pixels in the first row.

The pixel values shifted out of each of the buffers 80, 82, 84 and 86 and the pixel values input to the fifth row of the convolution mask are input to the buffer in the row above on every clock cycle while the convolution of the first row is being performed. For example, pixel values output from buffer 82 are input to buffer 80. Thus, after processing the first row of the image, buffer 80 contains the pixel values of the second row of the image, buffer 82 contains the pixel values of the third row of the image, buffer 84 contains the pixel values of the fourth row of the image, and buffer 86 contains the pixel values of the fifth row of the image. Thus, the convolution window is effectively shifted down by one row with respect to the image. Pixel values of the sixth row of the image are input to the fifth row of the multiplier unit 10 from the data source. In this manner, convolutions are performed on the second row of the image. This process is repeated until convolutions have been performed on each pixel of the image.

It will be apparent that pixel values will not be available for all of the locations in the convolution window near the edges of the image. For example, when the top row of the image is being convolved, pixel values are not available for the first two rows of the 5×5 convolution window. The lack of pixel values can be addressed in several ways. In one approach, pixels near the edge of the image are not convolved, and the output image is smaller than the source image. This approach is less desirable for large convolution windows. In another approach, arbitrary pixel values, such as for example constant values, are used to fill the empty locations in the convolution window. In still another approach, the pixel values in a row or column at the edge of the image are duplicated and are used to fill the empty locations in the convolution window.

A circuit configuration for performing a 7×7 convolution of an image, using the 5×5 convolver circuit shown in FIGS. 1–3 and described above, is shown schematically in FIGS. 5 and 6. Multipliers M0, M1, . . . M24 are positioned with respect to a 7×7 convolution window for performing a first pass of the 7×7 convolution in FIG. 5. Multipliers M0, M1, . . . M24 are positioned with respect to the 7×7 convolution window for performing a second pass of the 7×7 convolution in FIG. 6. The 5×5 multiplier array shown in FIG. 2 is reconfigured in FIG. 5 such that multipliers M0, M1, . . . M6 process pixels in a first row of the convolution window; multipliers M7, M8 . . . M13 process pixels in a second row of the 7×7 convolution window; multipliers M14, M15 . . . M20 process pixels in a third row of the convolution window; and multipliers M21, M22, M23 and M24 process the first four pixels in a fourth row of the 7×7 convolution window. A technique for reconfiguring the 5×5 convolver circuit is described below with reference to FIG. 7. Buffers 80, 82 and 84 supply pixel values for three consecutive rows of the image to the multipliers in the first three rows of the convolution window. A pixel data source, such as the host computer, supplies pixel values to multipliers M21, M22, M23 and M24 in the fourth row of the convolution window.

The first pass of the 7×7 convolution is performed as follows. Buffers 80, 82 and 84 load pixel values into the pixel value registers of the multipliers in the first three rows of the convolution window, and multipliers M21, M22, M23 and M24 are loaded with pixel values from the data source. A subset of the coefficients of a 7×7 convolution mask are loaded into the corresponding coefficient registers in each of the multipliers. Multipliers M0, M1, . . . M24 multiply the values in the respective pixel value registers and coefficient registers to provide products. The products R0, R1 . . . R24 are combined by summer 12 to provide an intermediate result for the first pixel in the first row of the image. The intermediate result is stored in memory 20 at an address corresponding to the pixel being processed. Then the pixel values in the pixel value registers of each row of the convolution window are shifted one position to the right, new pixel values are shifted into the pixel value registers of multipliers M0, M7 and M14 from buffers 80, 82 and 84, respectively, and a new pixel value is loaded into the pixel value register of multiplier M21 from the data source. The multiplications for the second pixel in the first row are performed, and the products R0, R1 . . . R24 are combined by summer 12 to provide an intermediate result for the second pixel in the first row of the image. The intermediate result is loaded into memory 20. This process is repeated for each pixel in the image until the intermediate result for each pixel has been loaded into memory 20, thus completing the first pass of the 7×7 convolution. In the manner described above in connection with FIG. 5, the outputs of each buffer are loaded into the input of the buffer in the row above on each clock cycle, so that the convolution window is effectively shifted down by one row with respect to the image after completion of processing for each row.

Figure 6:
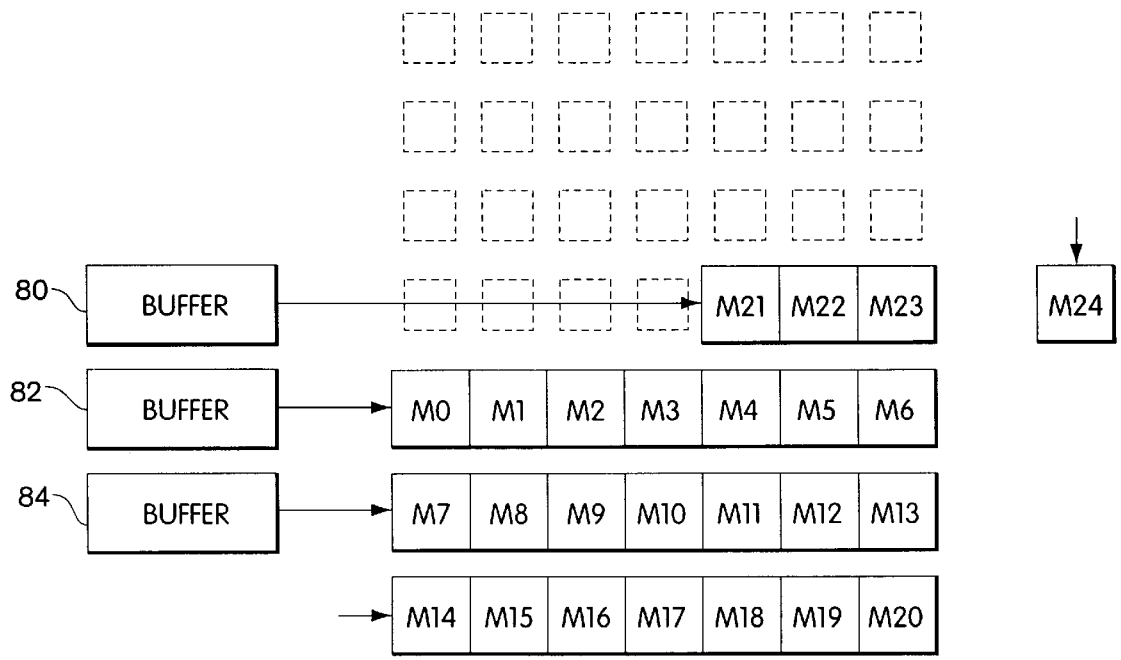
FIG. 6 is a schematic representation of a technique for performing a second pass of a 7×7 convolution using the 5×5 convolver circuit of FIGS. 1–3.

A circuit configuration of the 5×5 convolver circuit for the second pass of the 7×7 convolution is shown in FIG. 6. Multipliers M21, M22 and M23 process the last three pixels in the fourth row of the 7×7 convolution window. Multipliers M0, M1, . . . M6 process pixels in the fifth row of the 7×7 convolution mask; multipliers M7, M8, . . . M13 process pixels in the sixth row of the 7×7 convolution window and multipliers M14, M15, . . . M20 process pixels in the seventh row of the 7×7 convolution window. Buffers 80, 82 and 84 supply pixel values to the multipliers in the fourth, fifth and sixth rows, respectively, of the convolution window, and the data source supplies pixel values to the multipliers in the seventh row of the convolution window. Since multipliers M21, M22 and M23 process the last three pixels in the fourth row of the convolution window, a four stage register, corresponding to the first four pixels in the fourth row, is connected between buffer 80 and multiplier M21 during the second pass to insure proper timing of pixel data supplied to multipliers M21, M22 and M23. Because the coefficients in the lower portion of the convolution mask, in general, are different from those in the upper portion of the convolution mask, the coefficient registers in each of the multipliers are loaded with the coefficients for the lower portion of the convolution mask during the second pass. The pixel values are multiplied by the corresponding coefficients to provide products R0, R1, . . . R3. The intermediate result obtained for the same pixel during the first pass is read out of memory 20 and is combined with the result from the second pass. In the embodiment of FIG. 6, the intermediate result is supplied to multiplier M24, and the coefficient register of multiplier M24 is loaded with a value of 1. Thus, the intermediate value from the first pass is supplied to summer 12 during the second pass as product R24. The products R0, R1, . . . R23 from the second pass and the intermediate result from the first pass (R24) are combined by summer 12 to provide a final result for the 7×7 convolution. It will be understood that the intermediate result may be provided directly to the R24 input of summer 12 if desired, where R24 represents a multiplier that is unused during the second pass of the 7×7 convolution. Each pixel in the image is processed in the same manner during the second pass of the 7×7 convolution. The intermediate result from the first pass is read out of memory 20 and is combined with the result from the second pass to provide a final result for each pixel.

Figure 4:
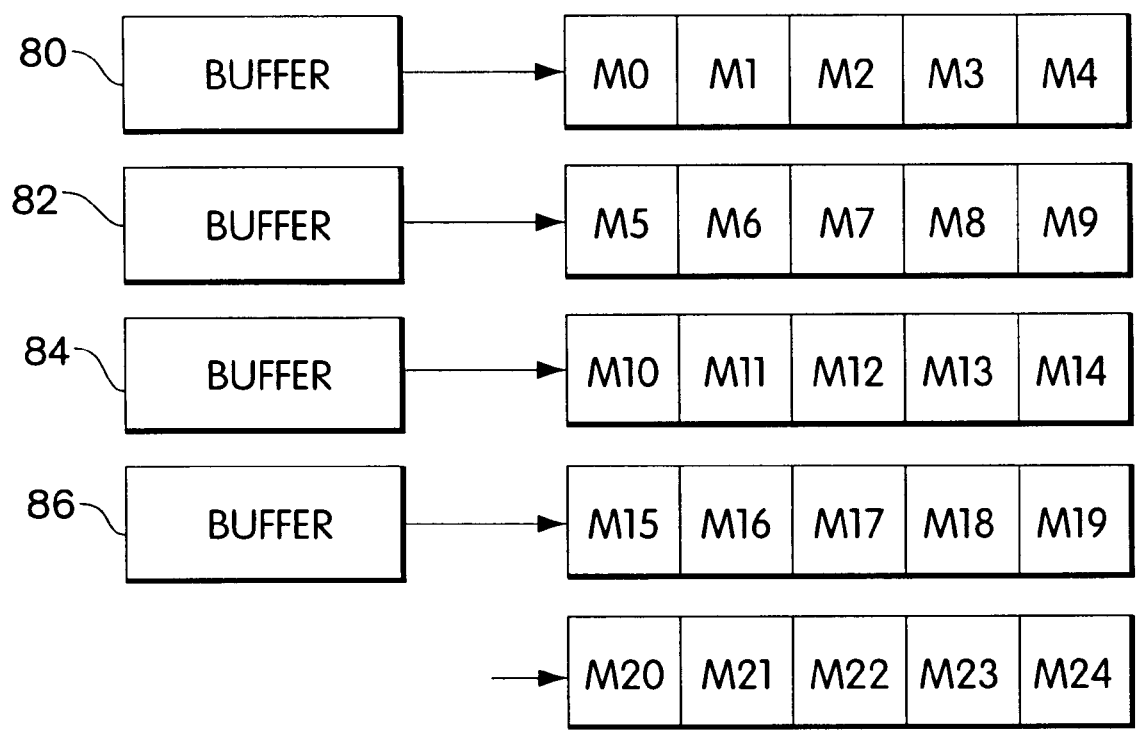
FIG. 4 is a schematic representation of a technique for performing a 5×5 convolution with the convolver circuit of FIGS. 1–3;
}
Figure 5:
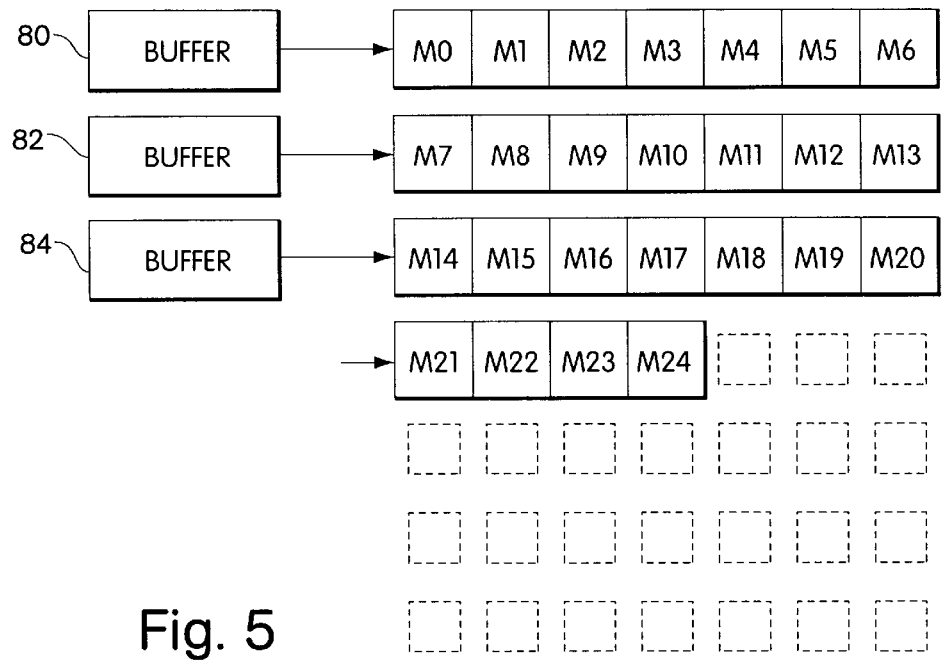
FIG. 5 is a schematic representation of a technique for performing a first pass of a 7×7 convolution using the 5×5 convolver circuit of FIGS. 1–3.

Reconfiguration of the 5×5 convolver circuit to perform a 7×7 convolution in two passes is described with reference to FIG. 7. Reconfiguration is effected by supplying different pixel values to certain multipliers in the 5×5 convolver circuit. In particular, some multipliers in the 5×5 convolver circuit may receive the pixel values from the same source, while other multipliers in the 5×5 convolver circuit receive pixel values from a different source when the convolver circuit is reconfigured. The selection of data for those multipliers that require different pixel values can be controlled by a multiplexer. With reference to FIGS. 4 and 5, it can be seen that multipliers M0, M1, . . . M4 remain in the same position relative to a row of the convolution window in the 5×5 convolution of FIG. 4 and in the first pass of the 7×7 convolution of FIG. 5. However, in the second pass of the 7×7 convolution shown in FIG. 6, multiplier M0 receives pixel values from buffer 82 rather than buffer 80. A multiplexer (not shown) can be used to switch the source of pixel values supplied to multiplier M0 from buffer 80 to buffer 82 in the second pass. Multipliers M5 and M6 appear in the first two positions of the second row in the 5×5 convolution (FIG. 4), appear in the last two positions of the first row in the first pass of the 7×7 convolution (FIG. 5) and appear in the last two positions of the fifth row in the second pass of the 7×7 convolution (FIG. 6). Multiplier M5 receives input pixel values from buffer 82 in the 5×5 convolution and receives pixel values from the pixel register of multiplier M4 in both the first and second passes of the 7×7 convolution. With reference to FIG. 7, a multiplexer 130 controls the source of pixel data supplied to pixel register 132 of multiplier M5. The multiplexer 130 is controlled by the A control signal that indicates whether the convolver circuit is being used to perform a 5×5 convolution or a 7×7 convolution. When a 5×5 convolution is being performed, the input pixel value of the second row of the convolution window is supplied by multiplexer 130 to pixel register 132. When a 7×7 convolution is being performed, the output of the pixel register of multiplier M4 is supplied by multiplexer 130 to pixel register 132.

In a similar manner, multipliers M7, M8 and M9 appear in the last three positions of the second row of the 5×5 convolution window (FIG. 4); appear in the first three positions of the second row of the convolution window in the first pass of the 7×7 convolution; and appear in the first three positions of the sixth row in the second pass of the 7×7 convolution window. Accordingly, a multiplexer 140 controls the source of pixel values supplied to pixel register 142 of multiplier M7. When a 5×5 convolution is being performed, multiplexer 140 supplies the output of pixel register 144 (multiplier M6) to pixel register 142 (multiplier M7). When the first pass of a 7×7 convolution is being performed, multiplexer 140 supplies pixel values from buffer 82, corresponding to the second row of the convolution window. When the second pass of the 7×7 convolution is being performed, the multiplexer 140 supplies pixel values from buffer 84, corresponding to the sixth row of the convolution window.

An inspection of FIGS. 4–6 indicates that multipliers M0, M5, M7, M10, M14, M15, M20, M21 and M24 require multiplexers for controlling the source of the pixel values supplied to those multipliers. In each case, the multiplexer supplies pixel values to the multiplexer in accordance with the convolution and pass being processed. The remaining multipliers in the 5×5 convolver circuit do not require multiplexers for the 7×7 convolution.

As is evident from FIG. 5, the bottom three rows of pixel values in the image are not required during the first pass of the 7×7 convolution. Similarly, the top three rows of pixel values in the image are not required for the second pass of the 7×7 convolution.

The reconfigurable convolution circuit of the present invention has been described above with reference to a 5×5 convolver circuit that is reconfigured for performing a 7×7 convolution in two passes. The 5×5 convolver circuit can be configured to perform convolutions having other dimensions. A 3×3 convolution can be performed with the 5×5 convolver circuit by setting the values of the coefficients to 0 on the perimeter of the 5×5 convolution window. Thus with reference to FIG. 4, the coefficients of the convolution mask for multipliers M0–M4, M5, M9, M10, M14, M15, M19 and M20–M24 are set to 0 for a 3×3 convolution. More generally, an M×M convolver circuit may be used to perform an L×L convolution, where L is less than M and the coefficients of unused multiplexers are set to 0.

Figure 8:
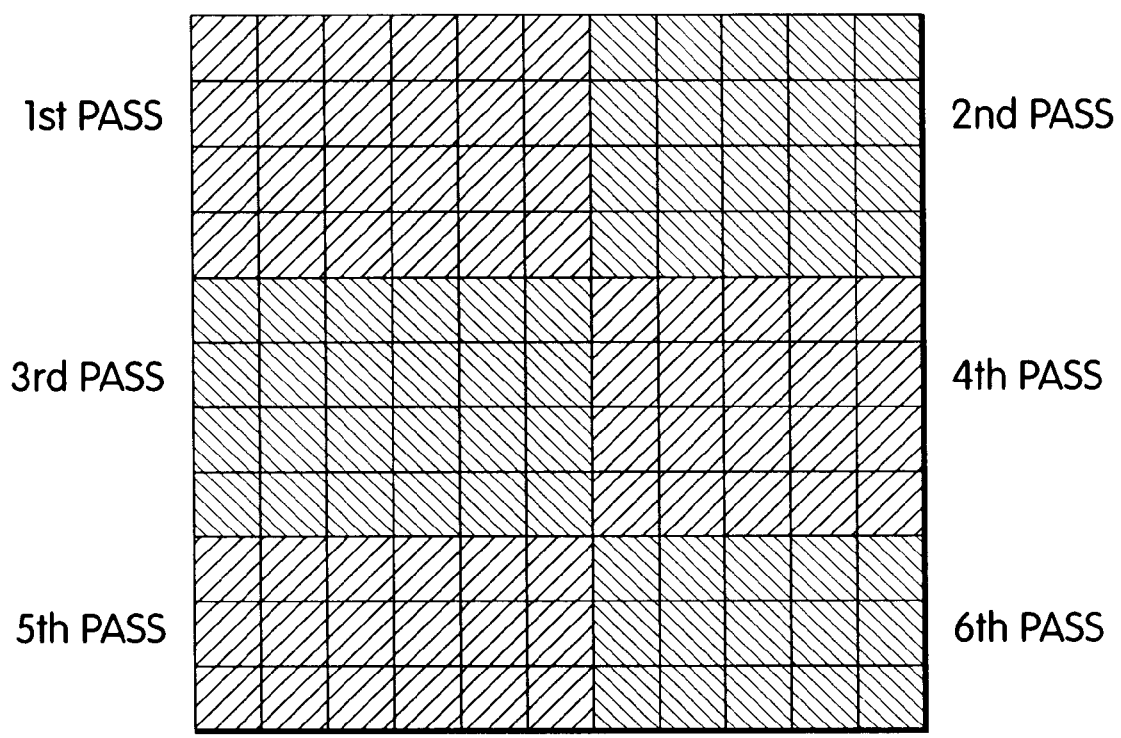
FIG. 8 is a schematic representation of an 11×11 convolution window, illustrating a technique for performing an 11×11 convolution with a 5×5 convolver circuit.

An 11×11 convolution can be performed by the 5×5 convolver circuit by reconfiguring the multipliers in a 4×6 array and using six passes as shown in FIG. 8. Each pass produces an intermediate result. The intermediate results can be stored and combined with the result of the sixth pass or can be combined with the intermediate result of the next pass to provide a final result of the 11×11 convolution. By using a 4×6 multiplier array, one of the 25 multipliers of the 5×5 convolver circuit is left available in each pass to bring the intermediate result that is stored in the local memory after the preceding pass. With reference to FIG. 8, the 4×6 multiplier array is used, with all rows and columns active, for the first and third passes. In the second and fourth passes, one column of the 4×6 multiplier array is inactive. In the fifth pass, one row of the 4×6 multiplier array is inactive, and in the sixth pass, one row and one column are inactive. During each pass, there are some pixels in the input image that are not used. The controlling software must not send the unused pixels and must keep track of the location of the intermediate results in the memory 20. In a similar manner, convolutions can be performed for convolution mask sizes of 9×9, 13×13, 15×15 and larger. As the convolution mask size increases, the number of passes increases, but the performance increase as compared to a CPU software-based solution stays about the same.

It will be understood that the number of multipliers in the reconfigurable convolver circuit may be varied within the scope of the present invention. The multiplier unit may utilize a square multiplier array, such as an M×M multiplier array, or a rectangular multiplier array, such as an $M_1 \times M_2$ multiplier array, or any other configuration of multipliers. As described above, a square 5×5 multiplier array may be utilized to perform a 5×5 convolution. The 5×5 convolver circuit is reconfigured to a rectangular 4×6 multiplier array to perform an 11×11 convolution as shown in FIG. 8. The 5×5 multiplier array is reconfigured to an irregular array, having three rows of 7 multipliers and one row of less than 7 multipliers, to perform a 7×7 convolution, as shown in FIGS. 5 and 6. The number of passes utilized to perform a convolution and the configuration of the multipliers in each pass may be varied within the scope of the invention. As shown in FIGS. 5 and 6, different multiplier configurations are used in the first and second passes of a 7×7 convolution. One or more multipliers may not be utilized in a given pass. See for example, the 11×11 convolution shown in FIG. 8. The convolver circuit may be utilized to perform convolutions wherein the number of pixel values in the convolution window is greater than the number of multipliers in the convolver circuit. For example, a convolver circuit having M×M multipliers may be utilized to perform an N×N convolution, where N is greater than M. Furthermore, the convolver circuit may be utilized to perform convolutions where the number of pixel values in the convolution window is less than the number of multipliers in the convolver circuit. The final result of the convolution may be computed iteratively, with the result of each pass being added to result of the preceding pass to provide a final result or a new intermediate result. Alternatively, the intermediate results may be saved until the end of the convolution and combined together with the result of the final pass to provide a final result of the convolution. The pixels of an image are typically convolved row by row. However, the pixels can be convolved column by column, or in any other desired order. Pixel values of the convolution window and corresponding coefficients of the convolution mask may be provided to the multipliers of the multiplier unit in any desired manner. In the example of FIG. 2, each multiplier includes a pixel value register and a coefficient register. The pixel value registers of each row are chained together. However, pixel values may be written separately to each of the pixel value registers.

In a gray scale image, each pixel is represented by a single pixel value having a predetermined number of bits. The convolver circuits shown and described herein perform convolutions of each pixel value in the image. In a color image, each pixel is represented by red, green and blue pixel values. In this case, three convolver circuits shown and described herein may be used to perform convolutions of the three color values in parallel. Alternatively, a single convolver circuit may be used to convolve the sets of red, green and blue pixel values in sequence.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A reconfigurable convolver for performing a convolution of pixels of an image, comprising:

a plurality of multipliers for multiplying pixel values of a convolution window by corresponding coefficients of a convolution mask to provide products;

a summer coupled to said multipliers for summing said products to provide a result;

a memory for storing intermediate results; and a controller including:

means for selectable reconfiguring said multipliers in a first convolver configuration, a second convolver configuration or a third convolver configuration;

means for supplying to the third configuration of said multipliers, during an M×M convolution, pixel values of an M×M convolution window and corresponding coefficients of an M×M convolution mask, wherein said summer provides a final result for the M×M convolution;

means for supplying to the first configuration of said multipliers, during a first pass of an N×N convolution, where N is greater than M, a first subset of pixel values of an N×N convolution window and a first subset of corresponding coefficients of an N×N convolution mask, wherein said summer provides an intermediate result for the first pass of the N×N convolution;

means for storing said intermediate result in said memory; and means for supplying to the second configuration of said multipliers, during a second pass of the N×N convolution, a second subset of the pixel values of said N×N convolution window and a second subset of corresponding coefficients of said N×N convolution mask and for supplying said intermediate result from said memory to said summer, wherein said summer combines said intermediate result with a result of said second pass to provide a final result or a second intermediate result for the N×N convolution.

2. A reconfigurable convolver as defined in claim 1 wherein M=5 and N=7.

3. A reconfigurable convolver as defined in claim 1 wherein said multipliers include M×M multipliers and said summer includes (M×M)−1 adders.

4. A reconfigurable convolver as defined in claim 1 wherein each of said multipliers includes a pixel register for holding a pixel value and a coefficient register for holding a coefficient.

5. A reconfigurable convolver as defined in claim 1 further including a buffer for supplying pixel values of an image to said multipliers, wherein convolutions are performed for each of the pixels in said image.

6. A reconfigurable convolver for performing a convolution of pixels of an image, comprising:

a plurality of multipliers for multiplying pixel values of a convolution window by corresponding coefficients of a convolution mask to provide products;

a summer coupled to said multipliers for summing said products to provide a result;

a memory for storing intermediate results; and a controller including:

means for selectably reconfiguring said multipliers in a first convolver configuration, a second convolver configuration, a third convolver configuration or one or more intermediate convolver configurations;

means for supplying to the third configuration of said multipliers, during an M×M convolution, pixel values of an M×M convolution window and corresponding coefficients of an M×M convolution mask, wherein said summer provides a final result for the M×M convolution;

means for supplying to the first configuration of said multipliers, during a first pass of an N×N convolution, where N is greater than M, a first subset of pixel values of an N×N convolution window and a first subset of corresponding coefficients of an N×N convolution mask, wherein said summer provides a first intermediate result for the first pass of the N×N convolution;

means for storing said first intermediate result in said memory;

means for supplying to the one or more intermediate configurations of said multipliers, during each of one or more intermediate passes of the N×N convolution, an intermediate subset of the pixel values of said N×N convolution window and an intermediate subset of corresponding coefficients of said N×N convolution mask and for supplying to said summer, during each of said one or more intermediate passes, an intermediate result of a preceding pass, wherein said summer combines the intermediate result of the preceding pass with a result of a current pass to provide a current intermediate result of the N×N convolution;

means for storing said current intermediate result in said memory; and means for supplying to the second configuration of said multipliers, during a final pass of the N×N convolution, a final subset of the pixel values of said N×N convolution window and a final subset of corresponding coefficients of said N×N convolution mask and for supplying a last intermediate result from said memory to said summer, wherein said summer combines said last intermediate result with a result of said final pass to provide a final result for the N×N convolution.

7. A reconfigurable convolver as defined in claim 6 wherein M=5.

8. A reconfigurable convolver as defined in claim 6 wherein said multipliers include M×M multipliers and said summer includes (M×M)−1 adders.

9. A reconfigurable convolver as defined in claim 6 wherein each of said multipliers includes a pixel register for holding a pixel value and a coefficient register for holding a coefficient.

10. A convolver for performing a convolution of pixels of an image, comprising:

a plurality of multipliers for multiplying pixel values of a convolution window by corresponding coefficients of a convolution mask to provide products;

a summer coupled to said multipliers for summing said products to provide a result;

a memory for storing intermediate results; and a controller including:

means for selectably reconfiguring said multipliers in a first convolver configuration or a second convolver configuration;

means for supplying to the first configuration of said multipliers, during a first pass of an N×N convolution, a first subset of pixel values of an N×N convolution window and a first subset of corresponding coefficients of an N×N convolution mask, wherein said summer provides an intermediate result for the first pass of the N×N convolution;

means for storing said intermediate result in said memory; and means for supplying to the second configuration of said multipliers, during a second pass of the N×N convolution, a second subset of the pixel values of said N×N convolution window and a second subset of corresponding coefficients of said N×N convolution mask and for supplying said intermediate result from said memory to said summer, wherein said summer combines said intermediate result with a result of said second pass to provide a final result or a second intermediate result for the N×N convolution.

11. A convolver as defined in claim 10 wherein said multipliers include 25 multipliers and wherein N=7.

12. A convolver as defined in claim 10 wherein each of said multipliers includes a pixel register for holding a pixel value and a coefficient register for holding a coefficient.

13. A method for performing a convolution of pixels of an image with a convolver including a plurality of multipliers for multiplying pixel values of a convolution window by corresponding coefficients of a convolution mask to provide products and a summer coupled to said multipliers for summing said products to provide a result, said method comprising the steps of:

a) selectably reconfiguring said multipliers in a first convolver configuration, a second convolver configuration or a third convolver configuration;

b) supplying to the third configuration of said multipliers, during an M×M convolution, pixel values of an M×M convolution window and corresponding coefficients of an M×M convolution mask, said summer providing a final result for the M×M convolution;

c) supplying to the first configuration of said multipliers, during a first pass of an N×N convolution, where N is greater than M, a first subset of pixel values of an N×N convolution window and a first subset of corresponding coefficients of an N×N convolution mask, said summer providing an intermediate result of the first pass of the N×N convolution;

d) storing said intermediate result; and e) supplying to the second configuration of said multipliers, during a second pass of the N×N convolution, a second subset of the pixel values of said N×N convolution window and a second subset of corresponding coefficients of said N×N convolution mask, and supplying said intermediate result to said summer, said summer combining said intermediate result with a result of said second pass to provide a final result or a second intermediate result for the N×N convolution.

14. A method for performing a convolution as defined in claim 13 further including repeating steps c) and d) for each of the pixels in said image and then repeating step e) for each of the pixels in said image to provide said final result or said second intermediate result for the N×N convolution for each of the pixels in said image.

15. A method for performing a convolution of pixels of an image with a convolver including a plurality of multipliers for multiplying pixel values of a convolution window by corresponding coefficients of a convolution mask to provide products and a summer coupled to said multipliers for summing said products to provide a result, said method comprising the steps of:

selectable reconfiguring said multipliers in a first convolver configuration or a second convolver configuration;

supplying to the first configuration of said multipliers, during a first pass of an N×N convolution, a first subset of pixel values of an N×N convolution window and a first subset of corresponding coefficients of an N×N convolution mask, said summer providing an intermediate result of the first pass of the N×N convolution;

storing said intermediate result; and supplying to the second configuration of said multipliers, during a second pass of the N×N convolution, a second subset of the pixel values of said N×N convolution window and a second subset of corresponding coefficients of said N×N convolution mask, and supplying said intermediate result to said summer, said summer combining said intermediate result with a result of said second pass to provide a final result or a second intermediate result for the N×N convolution.

16. A method for performing a convolution as defined in claim 15 further including the steps of supplying to said multipliers, during each of one or more subsequent passes of the N×N convolution, a subsequent subset of the pixel values of said N×N convolution window and a subsequent subset of corresponding coefficients of said N×N convolution mask and supplying to said summer, during each of said one or more subsequent passes, an intermediate result of a preceding pass, wherein said summer combines the intermediate result of the preceding pass with a result of a current pass to provide a current intermediate result or the final result for the N×N convolution.

* * * * *

UNITED STATES PATENT AND TRADEMARK OFFICE
CERTIFICATE OF CORRECTION

PATENT NO. : 5,949,920
DATED : September 7, 1999
INVENTOR(S) : Stephen D. Jordan and Catherine J. Pfister It is certified that error appears in the above-identified patent and that said Letters Patent is hereby corrected as shown below:

Column 10,
Line 31, "selectable" should read -- selectably --

Column 13,
Line 18, "selectable" should read -- selectably --

Signed and Sealed this

Twenty-first Day of May, 2002

Attest:

JAMES E. ROGAN
*Attesting Officer*   *Director of the United States Patent and Trademark Office*